Feb. 28, 1950    R. C. BECK    2,498,640
PHOTOGRAPHIC FLASH LIGHTING APPARATUS
Filed Aug. 7, 1948    2 Sheets-Sheet 1
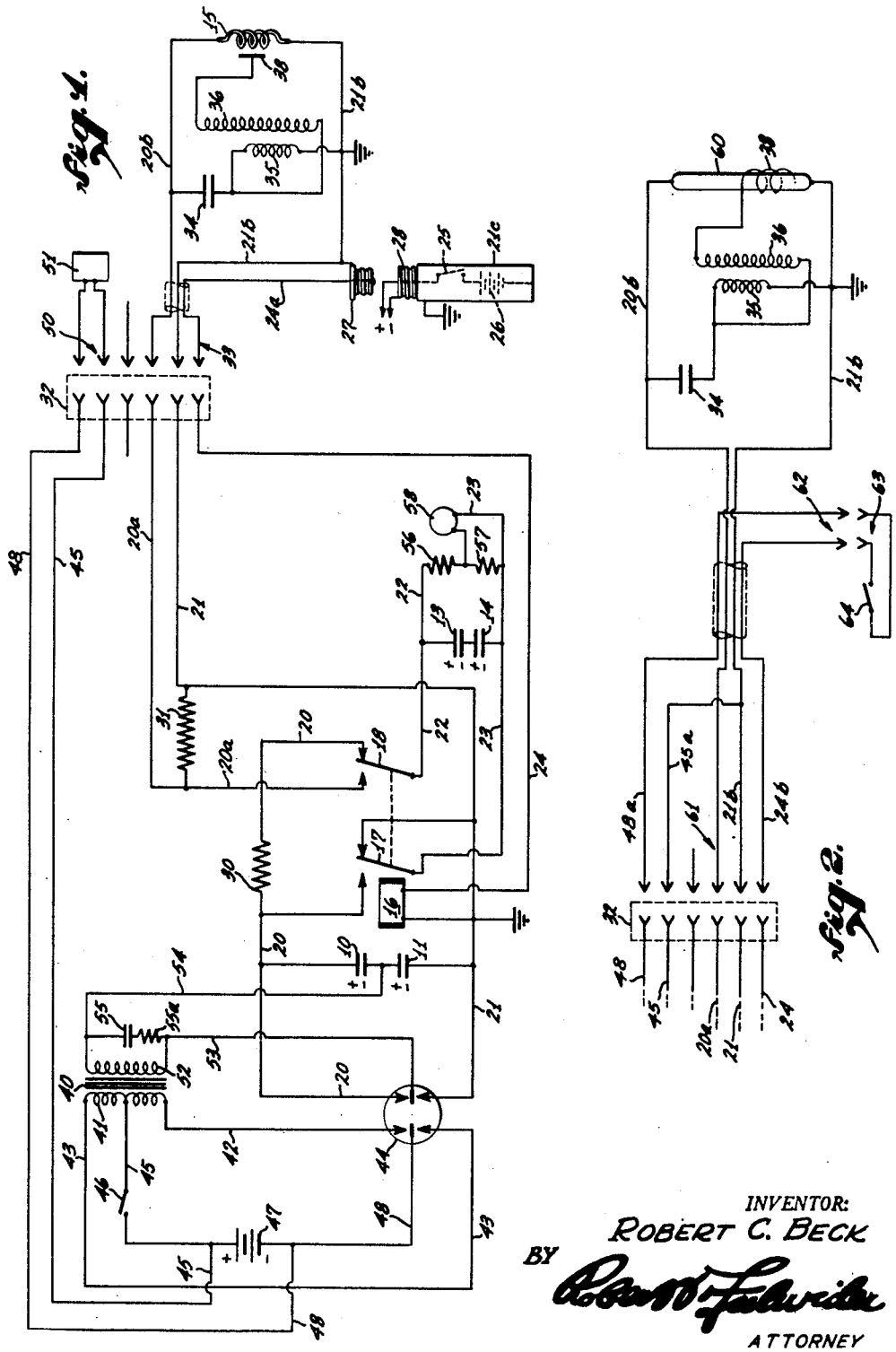
INVENTOR:
ROBERT C. BECK
BY
ATTORNEY Feb. 28, 1950 R. C. BECK 2,498,640
PHOTOGRAPHIC FLASH LIGHTING APPARATUS
Filed Aug. 7, 1948 2 Sheets-Sheet 2
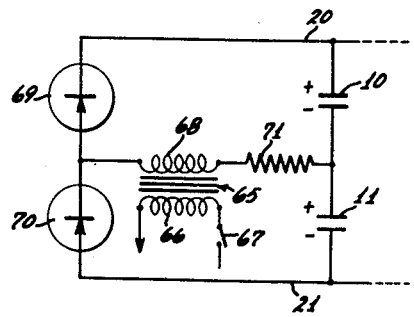
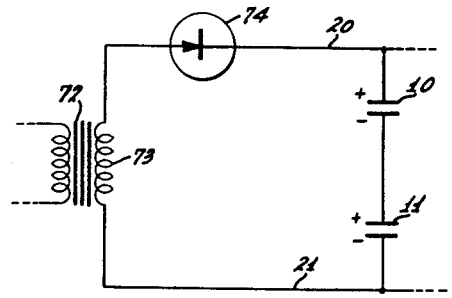
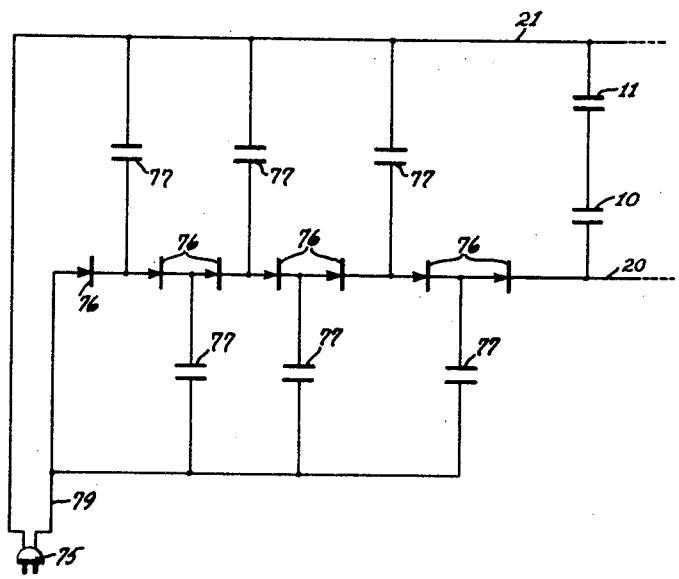
INVENTOR:
ROBERT C. BECK
BY
ATTORNEY Patented Feb. 28, 1950

2,498,640

UNITED STATES PATENT OFFICE 2,498,640

PHOTOGRAPHIC FLASH LIGHTING APPARATUS

Robert C. Beck, Los Angeles, Calif.

Application August 7, 1948, Serial No. 43,019

8 Claims. (Cl. 320—1)

1

This invention relates to photographic flash lighting equipment and more especially to apparatus for energizing and discharging gaseous discharge lamps used in connection with photography.

Gaseous discharge lamps have been used for some time in the lighting of a photographic subject, but the energizing and discharging apparatus and circuits for such lamps have been unsatisfactory for a number of reasons. Among these reasons are the relatively high voltages which are essential to the operation of such lamps, requiring the circuit apparatus such as transformers, rectifiers, connectors and wiring to be of a character to withstand such voltages. Furthermore, the apparatus has been relatively inefficient because of the low capacity attainable in the various energy storage condensers which have customarily been used.

The present invention has been developed around the use of electrolytic condensers which are known to be more efficient than paper or oil condensers, electrolytic condensers not having been used heretofore because it has been impractical to use them at sufficiently high voltages in conventional series-parallel circuits if there are any slight differences in the characteristics of the individual condensers. My present invention overcomes these objections and limitations by energizing the electrolytic condensers in individual units and applying their combined potentials only at the instant of firing or discharge by means of a simple relay, which relay is also used to control the delay or synchronization of the lamp flash with the shutter of the camera associated with it.

It is therefore a general object of my invention to provide novel means including apparatus and a circuit for energizing a plurality of electrolytic condensers and discharging such condensers through a gaseous type photographic discharge lamp.

A more specific object of the invention is to provide energizing and discharge means for photographic lamps capable of operating at a discharge voltage of the order of 1800 volts but having a charging circuit no component of which is subjected to more than 450 volts.

A further object of the invention is to provide a novel photographic flash apparatus employing electrolytic condensers which have an inherent series resistance, whereby the discharge rate is slower than with other types of condensers so that improved photographic effects on the film are obtainable.

An additional object of the invention is to provide photographic flash apparatus as set forth in the preceding objects which is lighter in weight, less costly and more efficient than apparatus now known and used for the stated purpose.

Another object of the invention is to provide novel apparatus for energizing and discharging a plurality of electrolytic condensers for photographic flash lamps wherein the apparatus may be powered from a low voltage circuit, such as a battery, or a conventional source of alternating current, such as the 110 volt circuits which are generally available.

With these and other objects in view, the invention consists in the construction, arrangement and combination of the various parts of the device whereby the objects contemplated are attained, as hereinafter set forth, pointed out in the appended claims and illustrated in the accompanying drawings, in which Fig. 1 is a diagrammatic view of the apparatus and a circuit therefor embodying a preferred form of my invention;

Fig. 2 is a diagrammatic view showing modified circuit means for the apparatus substantially as shown in Fig. 1;

Fig. 3 is a diagrammatic view showing modified energizing means for the circuits shown in Figs. 1 and 2;

Fig. 4 is a view similar to Fig. 3 of a further modified form of energizing means; and Fig. 5 is a diagrammatic view showing another modified form of energizing means for the same.

Referring more particularly to the drawings and especially to Fig. 1, I show a pair of electrolytic condensers 10 and 11 preferably having a nominal rating of 450 volts, and a pair of similar condensers 13 and 14. A gaseous discharge lamp 15 such as one adapted to be operated at substantially 1800 volts, may be connected to the condensers 10, 11, 13, and 14 by a relay 16 having a pair of gang-operated switch arms 17 and 18.

Condensers 10 and 11 are series connected and condenser 10 is connected to a wire or conductor 20 and condenser 11 connected to a conductor 21, which may be ground connected as shown. Wire 20 is connected to one of the contact terminals of relay switch arm 18, the other contact thereof being connected by wire 20a to one of the terminals of a receptacle 32 to be more fully described hereinafter, the plug 33 of such receptacle having a wire 20b connected to one of the terminals of lamp 15. Wire 21 is similarly connected to the receptacle 32 and the plug 33 has a terminal connected to a wire 21b which is connected to the other terminal of lamp 15 and suitably ground connected as shown to the lamp housing or otherwise.

Switch arm 18 is directly connected by a wire 22 to condenser 13 which is series connected to condenser 14, the latter being connected by a wire 23 to switch arm 17, one contact terminal of which is connected to wire 20 and the other connected to wire 21. The energizing coil of relay 16 has one end thereof connected to ground wire 21 and the other end connected by a wire 24 to receptacle 32. The corresponding terminal of the plug 33 is preferably connected by wire 24a to a conventional flash igniting battery case such as is found on many cameras and having a switch 25, a battery 26, and a suitable plug and receptacle 27 and 28, respectively, the latter being provided so that the battery and switch unit may be removed or replaced as necessary or desired. Battery 26 may be enclosed in a metallic casing 21c which is connected to wire 21b when plug 27 is engaged with receptacle 28.

A resistor 30 is connected in the conductor 20 between condenser 10 and the contact terminal of switch arm 18 as shown, and a resistor 31, which may be a carbon resistor having a value of substantially .5 to .6 of a megohm, is connected between the wire 20a and the wire 21 for discharging a condenser 34 hereinafter described. Receptacle 32, previously mentioned, may be any type of conventional multi-conductor receptacle and plug 33 may be a 3 or 4 wire plug to be associated therewith, wires 20a, 21 and 24 of the receptacle being connected to wires 20b, 21b, and 24a, respectively, of the plug when connected thereto.

The firing or discharge circuit of lamp 15 preferably includes a condenser 34 which may be a .001 to .25 microfarad paper condenser connected to wire 20b and in series with a coil 35 connected to wire 21b. Coil 35 is the primary of a transformer having a secondary 36, one of whose terminals is connected to the common connection of condenser 34 and coil 35, and the other terminal is connected to the electrode or coil 38 comprising the triggering element of lamp 15. Coil 35 preferably comprises 20 to 30 turns of #26 wire, space wound, and coil 36 is preferably a 1½ inch close wound coil of #38 to #44 enameled wire.

The power supply for the circuit may comprise a transformer 40 having a center tapped primary 41 whose end terminals are connected by wires 42 and 43 to the low voltage terminals of a vibrator 44 of a type well known in the art. A wire 45 including a switch 46 connects the center tap of primary 41 to one terminal of a battery 47 such as a 4-volt dry or storage battery whose other terminal is connected by a wire 48 to the low voltage reed of the vibrator 44. Wires 45 and 48 may be bridged to a pair of terminals of receptacle 32 and a 2-conductor plug 50 may be associated therewith and connected to a suitable charging device 51 for charging battery 47 if the battery is a storage battery. Plug 50 may be a 6-conductor plug, only two of its terminals being used.

Transformer 40 has a secondary 52 whose nominal output voltage is approximately 370 volts and which is connected by a wire 53 to the high voltage reed of vibrator 44 and by a wire 54 to the common connection of condensers 10 and 11. A buffer condenser 55 and series resistor 55a are preferably connected across the secondary 52 to correct any variations in the wave form of the alternating current supplied by the secondary 52.

A pair of series connected resistors 56 and 57 are connected to wires 22 and 23 and serve as a voltage dividing network for supplying the necessary voltage to a neon lamp 58 connected across resistor 57 to indicate the charge on condensers 13 and 14 for determining if the charge is sufficient to fire or discharge lamp 15.

Operation of Fig. 1

The operation of the invention as shown in Fig. 1 is as follows:

Upon the closing of switch 46, transformer 40 is energized from battery 47 and the rectified secondary current charges condensers 10 and 11 individually with a series of unidirectional current surges whose peak potential is approximately 450 volts. It will be obvious that when the condensers are sufficiently charged, the potential between wires 20 and 21 will be double that of either of the condensers, or approximately 900 volts. Relay switch arms 17 and 18 are spring biased to the position shown in Fig. 1 and the charging of condensers 10 and 11 will also charge condensers 13 and 14 which are now connected in parallel with condensers 10 and 11. Resistor 30 serves to limit the flow of current in condensers 13 and 14 whenever a difference of potential exists between these condensers and the pair of condensers 10 and 11. The neon lamp 58 will indicate when the condensers have attained their proper charge and show when the apparatus is in condition for discharge through lamp 15. When this condition has been reached, switch 25 may be closed to connect battery 26 to relay 16 whereupon switch arms 17 and 18 are moved to the left to contact position with wires 20 and 20a, respectively, thus connecting condensers 10, 11, 13 and 14 in series and in series with lamp 15 to fire or discharge the same, the triggering circuit, including condenser 34, coils 35 and 36, being simultaneously energized by the discharge current from the combined condensers and insuring the ionization and discharge of the lamp. After the discharge of lamp 15, resistor 31 will serve to dissipate the energy from condenser 34.

Description of Figs. 2-5

In Fig. 2, I show a modified circuit for utilizing the battery 47 for actuating the relay 16. In this figure I show a lamp 60, substantially similar to lamp 15, connected to a similar firing circuit including wires 20b and 21b which are connected to a plug 61 adapted to be connected to receptacle 32. Plug 61 has a wire 24b connected to a plug 62 adapted to be associated with a receptacle 63 mounted on a camera having a shutter switch 64. Plug 61 has a wire 48a connected to plug 62, and a wire 45a connected to wire 21b, wires 45a and 48a being connected to wires 45 and 48, respectively, when plug 61 is connected to receptacle 32. The operation of this circuit should be obvious. After the charging of the condensers 10, 11, 13 and 14 and the closing of shutter switch 64, relay 16 will be energized by the completion of a circuit from battery 47, through conductors 48 and 48a, switch 64, conductors 24 and 24b to the actuating coil of the relay, and then from the latter, through conductors 21, 21b, 45a, and 45 to the other terminal of the battery.

In Fig. 3, I show a modified means for charging the condensers. In this figure I show condensers 10 and 11 connected to wires 20 and 21 as in Fig. 1. A transformer 65 has a primary winding 66 with a control switch 67, and a secondary winding 68 having one terminal connected to the common connector of a pair of half wave rectifiers 69 and 70 and the other terminal connected by a surge resistor 71 to the common connection of condensers 10 and 11. Rectifiers 69 and 70 are connected to wires 20 and 21, respectively, as shown and may be of any desired type such as selenium cells. The circuit of Fig. 3 is a voltage doubler circuit, the direct current voltage supplied to wires 20 and 21 being twice that of the secondary winding 68 of the transformer.

In Fig. 4, I show another modified form of condenser charging means. In this figure a transformer 72 has its secondary winding 73 connected through a half wave rectifier 74 to wires 20 and 21 for charging condensers 10 and 11 with a half wave rectified current. The secondary voltage of winding 73 will, however, be the voltage that is applied to the two condensers in series.

In Fig. 5, I show still other means for charging condensers 10 and 11 connected to wires 20 and 21. In this figure the circuit includes a plug 75 for connection to a conventional 110 volt alternating current circuit, and a plurality of half wave rectifiers 76, such as selenium stacks, are connected with a plurality of condensers 77 as shown. This circuit and its operation is shown and described in United States Patent No. 2,072,278, issued March 2, 1937 to Schade, and in and of itself forms no part of my present invention except as it may be used and combined with other features and devices. The circuit shown will provide an output having a nominal rating of approximately 770 volts, providing a peak voltage of approximately 900 volts to which latter value the condensers 10 and 11 will be charged. This circuit eliminates transformers and reduces to zero the warm-up time which may be necessary if filament type rectifers are used.

While I have herein shown and described my invention in what I have conceived to be the most practical and preferred embodiment, it is recognized that departures may be made therefrom within the scope of my invention, which is not to be limited to the details disclosed herein but is to be accorded the full scope of the claims so as to embrace any and all equivalent devices.

I claim:

1. Photo flash apparatus as described comprising in combination: a first pair of series connected condensers; a second pair of series connected condensers; a discharge circuit; relay means for selectively connecting said pairs of condensers in parallel for charging, or connecting said condensers in series for discharge into said discharge circuit; and means for separately charging the individual condensers of said first pair, said last means including a source of alternating current and a half-wave rectifier for each of the condensers of said first pair, said source of alternating current including a battery, a transformer and a vibrator for the primary circuit of said transformer.

2. Photo flash apparatus as described comprising in combination: a first pair of series connected condensers; a second pair of series connected condensers; a discharge circuit; relay means for selectively connecting said pairs of condensers in parallel for charging while effectively disconnected from said discharge circuit, or connecting said pairs of condensers in series and to said discharge circuit for discharge therethrough; and means for charging the condensers of said first pair, said last means including a source of alternating current, a voltage multiplier and a half-wave rectifier for the condensers of said first pair.

3. Photo flash apparatus as described which includes: a first pair of series connected electrolytic condensers; a second pair of series connected electrolytic condensers; a resistor; a pair of output terminals; relay means normally connecting said second pair of condensers in series with said resistor and the series circuit thus formed in parallel with said first pair of condensers, said relay acting, when energized, to connect said first and second pairs of condensers in series and to said pair of output terminals; and charging means connected to said first pair of condensers to charge the latter and said second pair of condensers when said relay is de-energized.

4. An apparatus as described in claim 3 in which said charging means includes a pair of half-wave rectifiers each separately connected to a corresponding one of said first pair of condensers, whereby said condensers of said first pair are separately charged on opposite halves of a cycle of alternating current.

5. An apparatus as described in claim 3 in which said charging means includes a voltage multiplier intended for connection to a source of alternating current, and operable to provide at least half-wave rectified current.

6. Photo flash apparatus which includes: a first pair of series connected condensers; a second pair of series connected condensers; a pair of output terminals; relay means normally connecting said first and second pairs of condensers in parallel for charging and operable to connect said pairs of condensers in series and to said pair of output terminals; and means for separately charging the individual condensers of said first pair of series connected condensers.

7. Photo flash apparatus which includes: a first pair of series connected condensers; a second pair of series connected condensers; a pair of normally de-energized output terminals; relay means normally connecting said first and second pairs of condensers in parallel for charging while said condensers are effectively disconnected from said pair of output terminals, said relay means being operable to connect said pairs of condensers in series and simultaneously connect said series connected condensers to said pair of output terminals; and means for separately charging the individual condensers of said first pair of series connected condensers, the charge thus received by said first pair of condensers being used in the charging of said second pair of condensers.

8. Photo flash apparatus which includes: a first pair of series connected condensers; a second pair of series connected condensers; a pair of normally de-energized output terminals; a relay selectively operable to establish either a first or second condition; means connecting said first and second pairs of condensers in parallel, through said relay, when said relay is in said first condition, said pairs of condensers being effectively disconnected from said pair of output terminals, and to connect said first and second pairs of condensers in series through said relay when said relay is in said second condition; other means connecting said first and second pairs of condensers to said pair of output terminals when said relay is in said second condition; and means connected to said first pair of series connected condensers for charging the latter.

ROBERT C. BECK.

REFERENCES CITED

The following references are of record in the file of this patent:

UNITED STATES PATENTS

| Number | Name | Date |
|---|---|---|
| 2,047,463 | Dubilier | July 14, 1936 |
| 2,145,724 | Horsley | Jan. 31, 1939 |
| 2,349,437 | Keeler | May 23, 1944 |
| 2,358,796 | Edgerton | Sept. 26, 1944 |
| 2,383,492 | Klemperer | Aug. 28, 1945 |
| 2,420,845 | Slack et al. | May 20, 1947 |
| 2,447,832 | Abend et al. | Aug. 24, 1948 |